United States Patent
Simon, III et al.

(10) Patent No.: US 7,815,370 B2
(45) Date of Patent: Oct. 19, 2010

(54) APPARATUS, SYSTEM, AND METHOD FOR DETECTING TEMPERATURE THRESHOLD EVENTS IN AN AFTERTREATMENT DEVICE

(75) Inventors: Conrad J. Simon, III, Columbus, IN (US); Randall J. Stafford, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 244 days.

(21) Appl. No.: 11/871,037

(22) Filed: Oct. 11, 2007

(65) Prior Publication Data
US 2009/0097528 A1    Apr. 16, 2009

(51) Int. Cl.
*G01K 7/00*     (2006.01)
*G01K 11/00*    (2006.01)
*G01K 1/02*     (2006.01)

(52) U.S. Cl. ............... 374/185; 374/183; 374/160; 116/207; 116/216

(58) Field of Classification Search ........... 374/160, 374/183, 185; 116/207, 216
See application file for complete search history.

(56) References Cited

U.S. PATENT DOCUMENTS

| | | | | |
|---|---|---|---|---|
| 3,631,720 | A | * | 1/1972 | Weinstein et al. ............ 374/106 |
| 3,668,373 | A | * | 6/1972 | Laing ........................ 374/183 |
| 4,162,929 | A | * | 7/1979 | Finney ....................... 374/144 |
| 4,408,904 | A | * | 10/1983 | Tokarz ....................... 374/160 |
| 5,158,366 | A | * | 10/1992 | Nagai et al. ................. 374/183 |
| 5,255,511 | A | * | 10/1993 | Maus et al. .................. 374/144 |
| 5,339,628 | A | * | 8/1994 | Maus et al. .................. 374/E7.021 |
| 5,355,671 | A | * | 10/1994 | Maus et al. .................. 374/E7.021 |
| 5,428,956 | A | * | 7/1995 | Maus et al. .................. 374/E7.021 |
| 5,474,746 | A | * | 12/1995 | Maus et al. .................. 374/E3.005 |
| 5,975,758 | A | * | 11/1999 | Yokota et al. ................ 374/185 |
| 6,059,453 | A | * | 5/2000 | Kempf et al. ................ 374/185 |
| 6,137,669 | A | * | 10/2000 | Chiang et al. ................ 374/E3.009 |
| 6,597,276 | B1 | * | 7/2003 | Chiang et al. ................ 374/E3.009 |
| 7,253,740 | B2 | * | 8/2007 | Cain et al. ................... 374/E11.006 |
| 2004/0129065 | A1 | * | 7/2004 | Plote et al. .................. 73/117.3 |
| 2005/0159126 | A1 | * | 7/2005 | Wang ......................... 455/226.4 |

(Continued)

OTHER PUBLICATIONS

Firebaugh et al. "Investigation of high-temperature degradation of platinum thin films with an in situ resistance measurement apparatus". Microelectromechanical Systems, Journal of . vol. 7, Issue 1, Mar. 1998 pp. 128-135.*

*Primary Examiner*—Lisa M Caputo
*Assistant Examiner*—Jonathan Dunlap
(74) *Attorney, Agent, or Firm*—Kunzler Needham Massey & Thorpe

(57) ABSTRACT

An apparatus, system, and method are disclosed for detecting temperature threshold events in an aftertreatment device. The system may include an aftertreatment device configured to treat an exhaust gas of an internal combustion engine and a temperature responder disposed within a region of interest of the aftertreatment device. The temperature responder is configured to melt at a threshold temperature. The system may further include two access points electrically coupled to the temperature responder and an observation module configured to measure an electrical resistance value across the two access points. The observation module detects the melting of the temperature responder based on the electrical resistance value measured across the access points. In alternate embodiments the observation module is included within an engine control module (ECM) or a service tool.

25 Claims, 5 Drawing Sheets

U.S. PATENT DOCUMENTS

| | | | |
|---|---|---|---|
| 2005/0192512 A1* | 9/2005 | Butterworth | 600/549 |
| 2006/0142932 A1* | 6/2006 | Yasui | 701/114 |
| 2006/0199003 A1* | 9/2006 | Cain et al. | 374/100 |
| 2008/0229732 A1* | 9/2008 | Matsunami et al. | 374/100 |

* cited by examiner

APPARATUS, SYSTEM, AND METHOD FOR DETECTING TEMPERATURE THRESHOLD EVENTS IN AN AFTERTREATMENT DEVICE

BACKGROUND OF THE INVENTION

1. Field of the Invention

This invention relates to aftertreatment devices for treating engine exhaust streams, and more particularly relates to detecting the occurrence of temperature threshold events in aftertreatment devices.

2. Description of the Related Art

Emissions regulations for internal combustion engines have changed rapidly in recent years. To meet the new regulations, many engine manufacturers have had to install aftertreatment devices to reduce emissions in the exhaust gases, or to condition the exhaust gases to assist other aftertreatment devices. For example, particulate filters remove soot from the exhaust gases of a diesel engine, and diesel oxidation catalysts are sometimes used to generate temperature in the exhaust gas to assist a particulate filter in oxidizing the soot off of the filter.

Most aftertreatment devices experience thermal cycles during the operations of the engine. The thermal cycles may be intentional, for example during the removal of soot from a particulate filter, or unintentional such as when the engine experiences large changes in the required workload for the engine. Each thermal cycle induces a temperature gradient within the device. The temperature gradient within the device may cause stresses and over time can cause the aftertreatment device to fail. In general, the higher the maximum temperature experienced within the aftertreatment device, the larger the thermal gradient within the aftertreatment device. A high temperature can also cause stress and/or failure of an aftertreatment device independent of the temperature gradient induced in the device.

A stress related failure within an aftertreatment device, such as a crack in the wall of the aftertreatment device, can be particularly difficult to detect. There are no direct measurements routinely used in real-time for applications to detect such failures. Even when an aftertreatment device is being serviced, it is difficult for a service technician to detect such a failure even if the technician has a reason to look for it.

The aftertreatment device typically comprises a core—such as cordierite or silicon carbide honeycomb structure—wrapped in an insulating material that fixes the core in place, and the whole device is typically covered by a sheet metal and/or stainless steel shell or "can." A stress failure on a device occurs in the core, typically as radial cracking around the surface of the core, and is not visible to a technician merely handling the device. Therefore, the current detection failure schemes rely on either ultrasound or special visual inspection to determine whether an aftertreatment component has failed.

Ultrasound detection schemes are problematic because of the intentional porous nature of the aftertreatment devices, and the gaps in the surrounding insulating material. The ultrasound frequency must be so low (causing a low resolution image), and the aftertreatment devices are so poorly configured for ultrasound analysis, that often only the most catastrophic failures can be detected. However, some aftertreatment devices are no longer design compliant—which can mean regulatory emissions thresholds are not being met—with only a few moderate cracks around the device.

Special visual inspections require optic tools allowing the technician to view the interior of channels within the aftertreatment device. The channels of the device may be packed with soot and/or debris, rendering the inspection difficult or impossible. A minimal check of the device may require checking hundreds of channels around the perimeter of an aftertreatment device by repeatedly inserting a tool designed to go into small diameter channels which are at a packing density of 200-300 cells per square inch. The inspection procedure can damage the aftertreatment device, and is time consuming and costly under the best of circumstances.

Even where physical device failure of the aftertreatment device can be detected, high temperatures within the aftertreatment device can cause excessive degradation short of physical device failure. For example, an aftertreatment device may be expected to crack at 950 degrees C., but experience severe catalyst deactivation at 850 degrees C. with no physical indications of degradation. Catalyst degradation may induce additional stress on the device—for example increasing the average temperature at which soot oxidation can occur, and catalyst degradation may cause emissions increases. An aftertreatment device may be experiencing increased emissions without being detected.

A detection of the true temperature within the aftertreatment device is currently beyond the current technology at commercially reasonable prices. Current aftertreatment systems place a temperature sensing device—usually a thermistor and/or a thermocouple—just upstream and/or downstream of the aftertreatment device. The temperature within the aftertreatment device is often estimated as a function of these temperatures—for example a weighted average of the temperatures, or a thermal model based on the temperatures and estimated hydrocarbon or soot burning rates within the aftertreatment device plus estimated heat transfer effects. While the current temperature estimates are acceptable for certain estimates such as determining soot oxidation rates in steady state operation, the current temperature estimates do not estimate peak temperature events in transients very well. For example, a temperature spike may occur within the aftertreatment device, but the delay on the temperature sensing devices may cause the temperature sensing device to miss the highest portions of the spike and show temperatures 100 deg C. or more lower than the actual temperature event experienced within the aftertreatment device.

These limitations in the current technology introduce the risks attendant with aftertreatment devices with hidden defects. For example, a service company may clean aftertreatment devices and swap them out for a dirty aftertreatment device in a customer vehicle. Under the current state of technology, there is a significant risk that one of the swapped aftertreatment devices may have a stress failure or degraded catalyst, penalizing either the customer or the service company according to which device has failed.

SUMMARY OF THE INVENTION

From the foregoing discussion, applicant asserts that a need exists for an apparatus, system, and method that provides for detecting temperature threshold events in an aftertreatment system.

The present invention has been developed in response to the present state of the art, and in particular, in response to the problems and needs in the art that have not yet been fully solved by currently available aftertreatment temperature detection systems. Accordingly, the present invention has been developed to provide an apparatus, system, and method for detecting temperature threshold events that overcome many or all of the above-discussed shortcomings in the art.

An apparatus is disclosed for detecting temperature threshold events in an aftertreatment device. The apparatus comprises a temperature responder disposed within a region of interest of an aftertreatment device. The temperature responder comprises a structure formed of a material configured to melt at a threshold temperature. The apparatus further comprises an observation module configured to detect the melting of the temperature responder.

The apparatus may further comprise two access points. The temperature responder is configured to electrically couple the two access points, and the observation module is configured to measure an electrical resistance value across the two access points. The observation module detects the melting of the temperature responder based on the electrical resistance value. The apparatus comprises a thermal event module configured to determine whether a region of interest of the aftertreatment device has exceeded the threshold temperature based on the melting of the temperature responder.

The apparatus may further comprise a plurality of temperature responders, each temperature responder comprising a structure formed of a material configured to melt at a distinct threshold temperature. The plurality of temperature responders are configured to electrically couple the two access points in parallel. The thermal event module is further configured to determine whether the region of interest of the aftertreatment device has exceeded each distinct threshold temperature based the melting of each temperature responder. The apparatus further comprises the temperature responder disposed within an encapsulation device comprising a gas impermeable chamber.

The apparatus may further comprise an electronic control module (ECM). The ECM may comprise an observation module, a thermal event module, and a fault module. The thermal event module may set a thermal event indicator based on the melting of a temperature responder and the fault module may set a fault indicator based on the thermal event indicator.

A method is disclosed for detecting temperature threshold events in an aftertreatment device. The method comprises inserting a temperature responder into a region of interest in an aftertreatment device and checking the temperature responder for melting after a period of operation of the aftertreatment device. The method further comprises determining whether the region of interest of the aftertreatment device has exceeded the threshold temperature based on the melting of the temperature responder.

A system is disclosed for detecting temperature threshold events in an aftertreatment device. The system comprises an aftertreatment device configured to treat an exhaust gas of an internal combustion engine. The system further comprises the apparatus to detect temperature threshold events in the aftertreatment device. The system may further comprise an electronic control module (ECM) comprising the observation module, a thermal event module configured to set a thermal event indicator based on a temperature responder melting in a region of interest, and a fault module configured to set a fault indicator base on the thermal event indicator.

The system may further comprise a service tool. The service tool may comprise the observation module, a thermal event module configured to set a degradation indicator based on the region of interest of the aftertreatment device exceeding the threshold temperature, and a display module configured to provide the degradation indicator to a display outlet.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 5, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
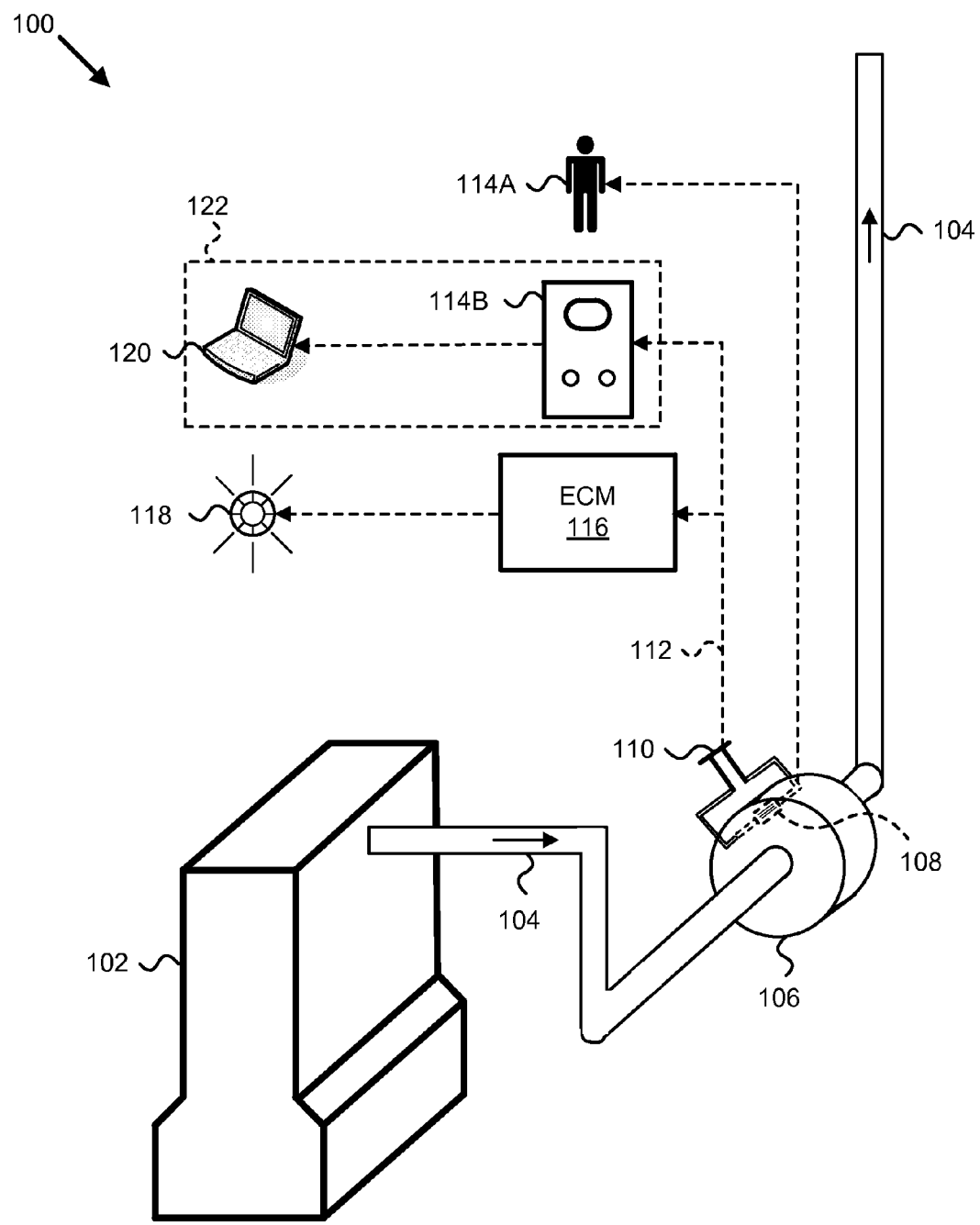
FIG. 1 is an illustration depicting one embodiment of a system for detecting temperature threshold events in an aftertreatment device in accordance with the present invention.

FIG. 1 is an illustration depicting one embodiment of a system 100 for detecting temperature threshold events in an aftertreatment device 106 in accordance with the present invention. The system 100 may comprise an internal combustion engine 102 that produces exhaust gas 104 as a byproduct of operation. For example, the engine 102 may be a diesel engine 102. The system 100 further comprises an aftertreatment device 106 configured to treat the exhaust gas 104. In one embodiment the aftertreatment device 106 may comprise a particulate filter configured to remove particulates from the exhaust gas 104. In alternative embodiments, the aftertreatment device 106 may be a diesel oxidation catalyst, a $NO_x$-adsorption catalyst, and/or other aftertreatment devices 106 known in the art.

The system 100 further comprises a temperature responder 108 disposed within a region of interest of the aftertreatment device 106. In one embodiment, the system 100 may comprise a plurality of temperature responders 108 disposed within each of a plurality of areas of interest within the aftertreatment device 106. The temperature responder 108 comprises a structure formed of a material configured to melt at a threshold temperature. The thermal responder 108 may be one of a wire and a material deposited on a surface of a channel within the aftertreatment device 106. The temperature responder 108 may comprise an electrically conductive material that may be sprayed, painted, plated, etched, printed, and/or inserted into a channel, or a plurality of channels, of the aftertreatment device 106 during manufacture. In an alternate embodiment, the temperature responder 108 may be placed within an aftertreatment device 106 by a service technician, for example to run a test and determine if a threshold temperature is reached in the aftertreatment device 106 during a test operating period.

The threshold temperature may be a temperature at or near a selected temperature of interest. For example, a selected temperature of interest may be about 400 degrees C. where a $NO_x$ based regeneration of soot may be expected to occur in a soot filter 106 in one embodiment of the system 100. In the example, the selected material for the temperature responder 108 material may be zinc (Zn), which melts at about 420 degrees C. The melting of the zinc would indicate that the threshold temperature for the particulate regeneration event has occurred successfully.

In another example, the threshold temperature of interest may be correlated to a desired desulfation event within a catalytic aftertreatment device 106, which may require a temperature of about 750 degrees C. for one embodiment of the system 100. In the example, the material selected for the temperature responder 108 material may be calcium, which melts at around 840 degrees C., or a platinum-titanium eutectic alloy, which melts at around 840 degrees C. In other embodiments of the system 100, temperatures known to degrade a catalyst, known to degrade the physical structure of an aftertreatment device, and/or known to destroy the aftertreatment device 106 may be selected temperatures of interest. For example, an aftertreatment device 106 may be known to suffer catastrophic damage above temperatures in the 1000 deg C. temperature range, and silver, gold, and/or copper may melt in the range of the selected temperature of interest. In one embodiment, the temperature responder 108 may comprise magnesium or aluminum. Based on the disclosures herein, it is a mechanical step for one of skill in the art to choose a threshold temperature and a material that melts in an appropriate range for the threshold temperature.

The system 100 may further comprise a plurality of temperature responders 108, each comprising a structure formed of a material to melt at a distance threshold temperature. In one embodiment, the temperature responders 108 may be configured to melt at a wide range of temperatures to check for different temperature threshold events. For example, the temperature responders 108 may comprise zinc, calcium, and silver melting at about 420 deg C., 840 deg C., and 960 deg C. In one embodiment, the temperature responders may be configured to melt in a narrow range of temperatures to bracket a temperature threshold event. For example, the temperature responders 108 may comprise brass, silver, and copper melting at just above 900 deg C., 960 deg C., and 1080 deg C. that may provide additional resolution to narrow down the achieved temperature during a temperature threshold event. The threshold temperatures, temperatures of various regeneration events, and temperatures causing damage to various aftertreatment devices 106 vary significantly for each system 100. The included examples are illustrative only and do not limit the scope of the present invention.

The system 100 may further comprise two access points 110, wherein the temperature responder 108 is configured to electrically couple the two access points 110. For example, the access points 110 may be electrically connected by a wire 108. In one embodiment, each of the two access points 110 exits the aftertreatment device 106 from opposite ends of the aftertreatment device 106 as shown in FIG. 1. In an alternate embodiment, the two access points 110 exit from the same end of the aftertreatment device 106 (for example, refer to FIG. 3). The access points 110 may provide access for a technician to attach an ohmmeter 114B, they may be capped to prevent corrosion, they may be hardwired into an onboard ECM 116, and the like. In one embodiment, the access points 110 are hardwired into an onboard ECM 116 by wiring the access points 110 to a separate computer (not shown) that reads the electrical resistance value across the access points 110 and publishes the electrical resistance value to a datalink (not shown) in communication with the ECM 116. The access points 110 may comprise the electrically conductive terminals of a connector (not shown) such that an ohmmeter 114B and/or other tool can be conveniently connected to the access points 110.

The system 100 further comprises an observation module 114 configured to measure an electrical resistance value 112 across the two access points 110, and detect the melting of the temperature responder 108 based on the electrical resistance value 112. In one embodiment the observation module 114 may be a person 114A that physically removes the temperature responder(s) 108 from the aftertreatment device 106 and visually inspects the temperature responder(s) 108 for melting. Based on whether the visual inspection reveals melting of the temperature responder 108 the person 114A may make a determination about the serviceability of the aftertreatment device 106 and/or record the information in a written service log and/or on an electronic device.

In an alternate embodiment, the observation module 114 may be an ohmmeter 114B, or similar electrical resistance detection device, electrically attached across the access points 110 to read the electrical resistance value 112. The electrical resistance value 112 may be communicated to a laptop computer 120 and/or other device for interpretation and storage. The laptop computer 120 and ohmmeter 114B may comprise a service tool 122 that detects temperature threshold events in the aftertreatment device 106. The functions of the service tool 122 may be combined into different hardware than shown in FIG. 1, for example as an integrated tool 122. The service tool 122 may determine the electrical resistance value 112 by reading a stored memory value from an engine control module (ECM) 116. In one embodiment, a person (not shown) may read the electrical resistance value 112 from the ohmmeter 114B.

In one embodiment of the system 100, the observation module 114 may be included within an ECM 116 to measure the electrical resistance value 112 across the two access points 110. Measuring the electrical resistance values 112 may comprise a direct measurement, reading a value from a network and/or datalink, and the like. The ECM 116 may comprise a single device or a series of devices distributed throughout the system 100. The ECM 116 may be further configured to determine whether the aftertreatment device 106 has exceeded a threshold temperature based on the melting of the temperature responder 108. For example, the ECM 116 may determine whether the electrical resistance value 112 is consistent with an open circuit between the access points 110 corresponding to the melting of the temperature responder 108.

The ECM 116 may be further configured to set a fault indicator 118 based on determining that a temperature responder 108 has melted exceeding a threshold temperature. The fault indicator 118 may be a lit dashboard lamp 118, a network data value (not shown), and/or a communicated signal (not shown). The fault indicator 118 may signify that an aftertreatment device 106 requires service, and/or signify that an aftertreatment device 106 requires replacement. In one embodiment, the ECM 116 may set an internal fault code that will alert a service technician 114A to the occurrence of the temperature threshold event when the service technician 114A engages a service tool 122 with the ECM 116.

Figure 2:
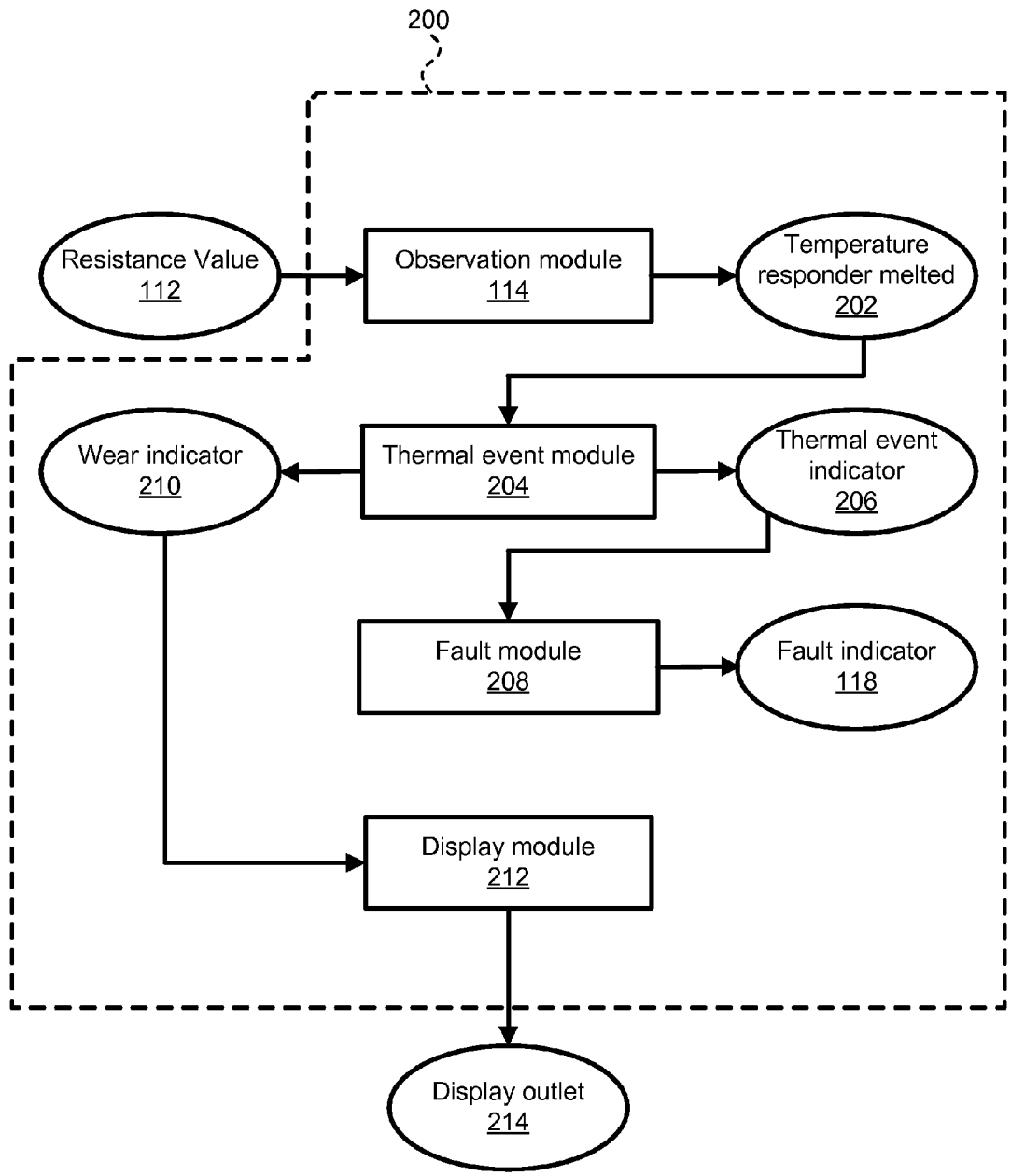
FIG. 2 is a schematic block diagram illustrating one embodiment of a controller to determine whether the region of interest of an aftertreatment device has exceeded the threshold temperature in accordance with the present invention.

FIG. 2 is a schematic block diagram illustrating one embodiment of a controller 200 to determine whether the region of interest of an aftertreatment device 106 has exceeded the threshold temperature in accordance with the present invention. The controller may be an ECM 116 installed on a vehicle, and/or a service tool 122.

The controller 200 comprises an observation module 114 that measures an electrical resistance value 112 across the access points 110 and detects the melting of the temperature responder(s) based on the electrical resistance value 112. The observation module 114 may set a temperature responder(s) 108 melted signal 202 when the temperature responder(s) 108 are melted. For example, the observation module 114 may detect the melting of the temperature responder(s) 108 by determining whether the electrical resistance value 112 is a value consistent with an open circuit between the access points 110.

The controller 200 may comprise a thermal event module 204 configured to determine whether the region of interest of the aftertreatment device 106 has exceeded the threshold temperature based on the melting of the temperature responder(s) 202. For example, the thermal event module 204 may read the temperature responder(s) 108 melted signal 202 and determine the region of interest of the aftertreatment device 106 has exceeded the threshold temperature if the thermal responder 108 has melted. In one embodiment, the thermal responder(s) 108 may comprise several thermal responder(s) 108 configured to melt at distinct temperatures, and the thermal event module 204 may determine that the threshold temperatures of the thermal responder(s) 108 that are melted have been exceeded, and that the threshold temperatures of the thermal responder(s) 108 that have not melted have not been exceeded.

The thermal event module may set a thermal event indicator 206 based on the region of interest of the aftertreatment device 106 exceeding the threshold temperature. The thermal event indicator 206 may be a value stored on the ECM 116 or other device to record the thermal history of an aftertreatment device 106. For example, the thermal event module 204 may store a time value indicating when an aftertreatment device 106 exceeded a certain temperature threshold.

The controller 200 may further comprise a fault module 208 configured to set a fault indicator 118 based on the thermal event indicator 206. For example, the thermal event indicator 206 may indicate that the aftertreatment device 106 has experienced a catastrophic temperature thermal event, and the fault module 208 may set a fault indicator 118 consistent with a failed aftertreatment device 106. The fault indicator 118 may be a lit dashboard lamp, a network data value, a communicated signal, and/or other fault indications known in the art.

In one embodiment, the fault indicator 118 may comprise the lighting of a malfunction indicator lamp (MIL) when catastrophic failure of the aftertreatment device 106 is indicated, and a fault code 118 published to a data network when a high temperature event that may not be catastrophic is indicated 206. In one embodiment, the temperature threshold may comprise a temperature consistent with a desulfation of the aftertreatment device 106, and the fault module 208 may set a fault indicator 118 consistent with a sulfur-poisoned catalyst when an application usage threshold is exceeded and a thermal event sufficient to drive sulfur off a catalyst in the aftertreatment device 106 has not occurred. In one example, the application usage threshold may be vehicle miles, a time of engine 102 operation, a total fuel burned in the engine 102, and the like. In one embodiment, the detection of a non-destructive temperature event may be a confirmation of proper operation of a component or process.

In one embodiment, the thermal event module 204 may be configured to set a degradation indicator 210 based on the region of interest of the aftertreatment device 106 exceeding a threshold temperature. For example, a first temperature responder 108 may be configured to melt at a temperature consistent with a medium degradation level, and a second temperature responder 108 may be configured to melt at a temperature consistent with a severe degradation level. The thermal event module 204 may set a degradation indicator 210 indicating "medium" when the first temperature responder 108 melts, and a degradation indicator 210 indicating "severe" when the second temperature responder 108 melts. The degradation indicator 210 may select a degradation indicator 210 by the type of degradation likely—for example a degradation indicator 210 consistent with catalyst degradation may be set when a thermal event likely to degrade a catalyst on the aftertreatment device 106 occurs.

The controller 200 may further comprise a display module 212 configured to provide the degradation indicator 210 to a display outlet 214. The display outlet 214 may comprise a computer screen, a printed report, a stored data value, and/or a data value published on a network. For example, the display outlet 214 may comprise a displayed field on a laptop screen that can be read by the service technician 114A.

Figure 3:
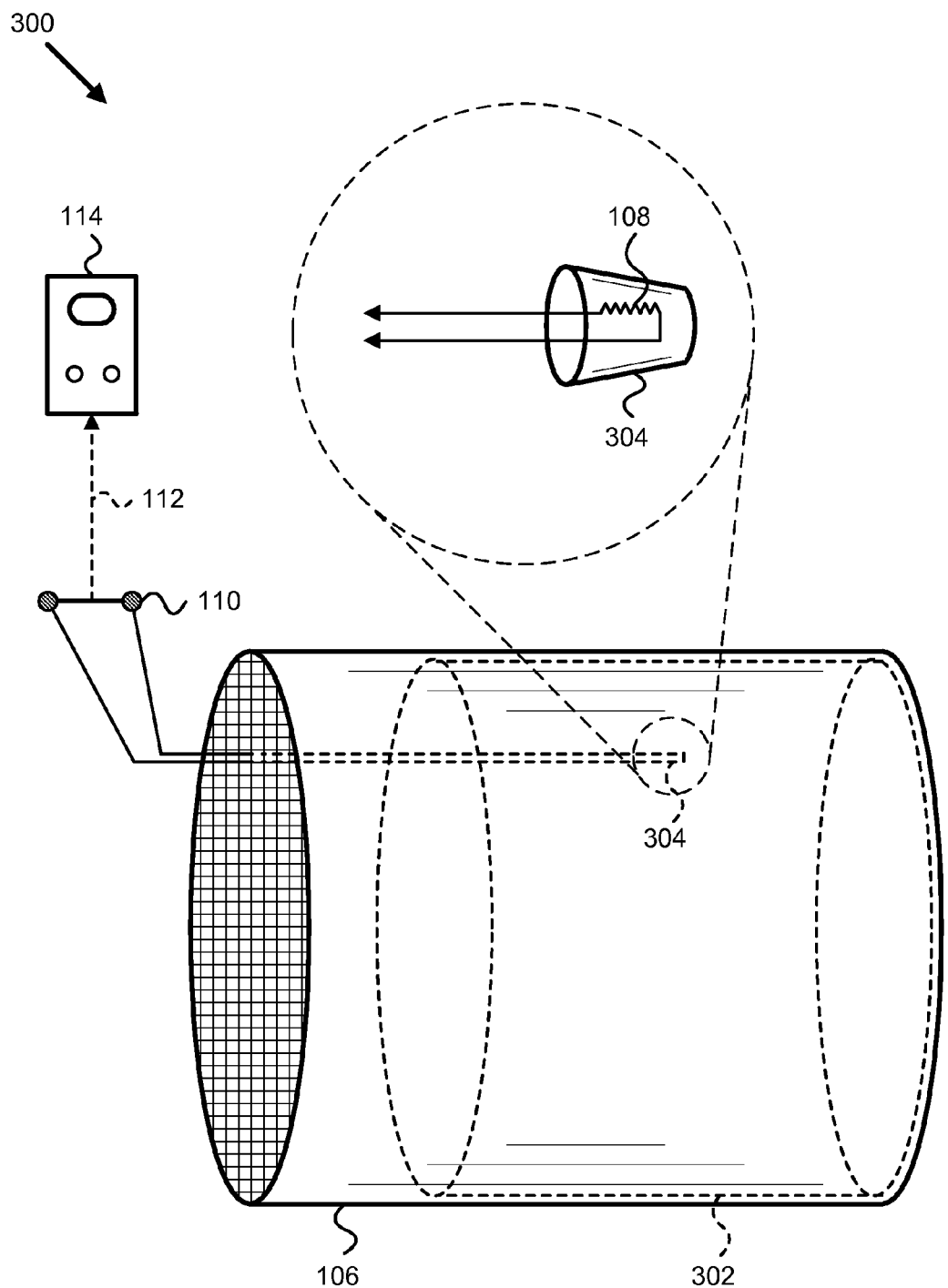
FIG. 3 is an illustration depicting one embodiment of an apparatus for detecting thermal events in an aftertreatment device in accordance with the present invention.

FIG. 3 is an illustration depicting one embodiment of an apparatus 300 for detecting thermal events in an aftertreatment device 106 in accordance with the present invention. The apparatus 300 comprises a temperature responder 108 disposed within a region of interest 302 of an aftertreatment device 106, and an observation module 114 configured to detect the melting of the temperature responder 108. The region of interest 302 may comprise a region 302 within the aftertreatment device 106 wherein thermal events may be expected to cause high stress in the aftertreatment device 106, where a regeneration temperature observation may be considered important, and the like. For example, a thermal event of interest within a particulate filter 106 where soot is expected to oxidize. In the example, soot may build up in the particulate filter 106 toward the rear (downstream) end of the filter 106, and the region of interest 302 may comprise the downstream portion of the particulate filter 106. In one embodiment, the region of interest 302 may comprise the entire aftertreatment device 106.

In one embodiment the region of interest 302 may be radially centered within the aftertreatment device 106. In an alternate embodiment the region of interest 302, as shown in FIG. 3, the region of interest 302 comprises an axial position between about 0.3 X to about 1.0 X, wherein X represents an axial position defined such that X=0 is an upstream end of the aftertreatment device, and X=1 is a downstream side of the aftertreatment device.

The apparatus 300 may further comprise a temperature responder 108 disposed within an encapsulation device 304. The encapsulation device 304 may be a gas impermeable chamber 304 disposed within the area of interest. The encapsulation device 304 may prevent the loss of the temperature responder 108 and/or a change in properties of the temperature responder 108 due to oxidation or other chemical effects. The encapsulation device 304 may be configured into any functional shape. For example, the encapsulation device 304 may comprise a tapered end to facilitate ease of manufacture.

Figure 4:
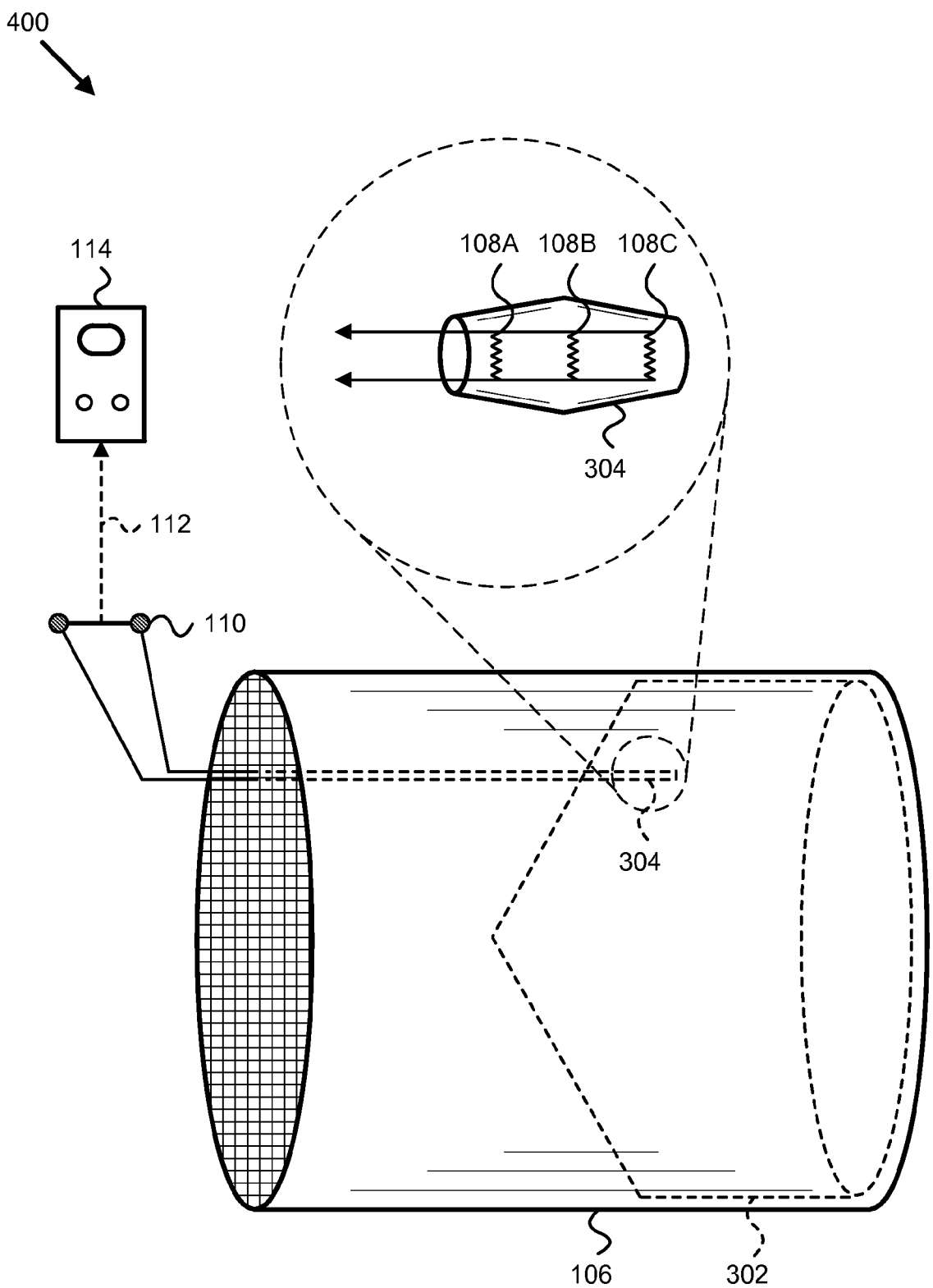
FIG. 4 is an illustration depicting one embodiment of an apparatus for detecting thermal events in an aftertreatment device in accordance with the present invention.

FIG. 4 is an illustration depicting one embodiment of an apparatus 400 for detecting thermal events within an aftertreatment device 106 in accordance with the present invention. The apparatus 400 comprises a plurality of temperature responders 108A, 108B, and 108C disposed within an encapsulation device 304 disposed within a region of interest 302 of an aftertreatment device 106. Each temperature responder 108 comprises a structure formed of a material configured to melt at a distinct threshold temperature. The plurality of temperature responders 108 is configured to electrically couple the two access points 110 in a parallel electrical circuit.

The observation module 114 may be further configured to detect the melting of each temperature responder 108A, 108B, 108C based on the electrical resistance value 112 across the two access points 110. The thermal event module 240 may be further configured to whether the region of interest 302 of the aftertreatment device 106 has exceeded each distinct temperature based on the melting of each temperature responder 108A, 108B, 108C, and to set a thermal event indicator 206 based on the region of interest 302 of the aftertreatment device 106 exceeding each threshold temperature. Each temperature responder 108A, 108B, 108C of the apparatus 400 may be further configured to provide a distinct electrical resistance within the circuit. By calculating the total electrical resistance of the circuit formed by the temperature responders 108, the access points 110, and the observation module 114, a determination may be made about which temperature responders 108 have melted.

In one example, $R_t$ is the total electrical resistance value of the parallel circuit between the access points 110, $R_a$ is the electrical resistance of a first resistor 108A, $R_b$ is the electrical resistance of a second resistor 108B, and $R_c$ is the electrical resistance of a third resistor 108C. In the example, the three temperature responders 108A, 108B, 108C are configured to provide electrical resistance at 100 ohms, 200 ohms, and 300 ohms, respectively. In the event that none of the temperature responders 108 have melted, $R_t$ equals about 55 ohms. In the event that only temperature responder 108A has melted, $R_t$ equals about 120 ohms. In the event that temperature responders 108A and 108B have melted the total resistance, $R_t$, equals about 300 ohms. In the event that all of the temperature responders 108A, 108B, and 108C have melted the total resistance, $R_t$ appears as an open circuit. The other melting scenarios for the example can be calculated by one of skill in the art based on the standard parallel resistance formula $1/R_t=1/R_a+1/R_b+1/R_c$.

In one embodiment, the apparatus 400 may include a blank electrical resistor (not shown) configured such that the blank electrical resistor will not melt under any expected conditions. The blank electrical resistor provides a baseline electrical resistance such that the access points 110 never provide an open circuit electrical resistance, and can be used for diagnostics of the thermal responders 108. For example, if the embodiment illustrated in FIG. 4, including the example electrical resistance values above, included a fourth resistor of 500 ohms in parallel with the thermal responders 108A, 108B, 108C, an open circuit electrical resistance of 500 ohms would be the highest resistance normally observed. In the example, an open circuit electrical resistance across the access points 110 may indicate a problem that is not necessarily due to a thermal event melting the temperature responders 108A, 108B, 108C.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps show.

Figure 5:
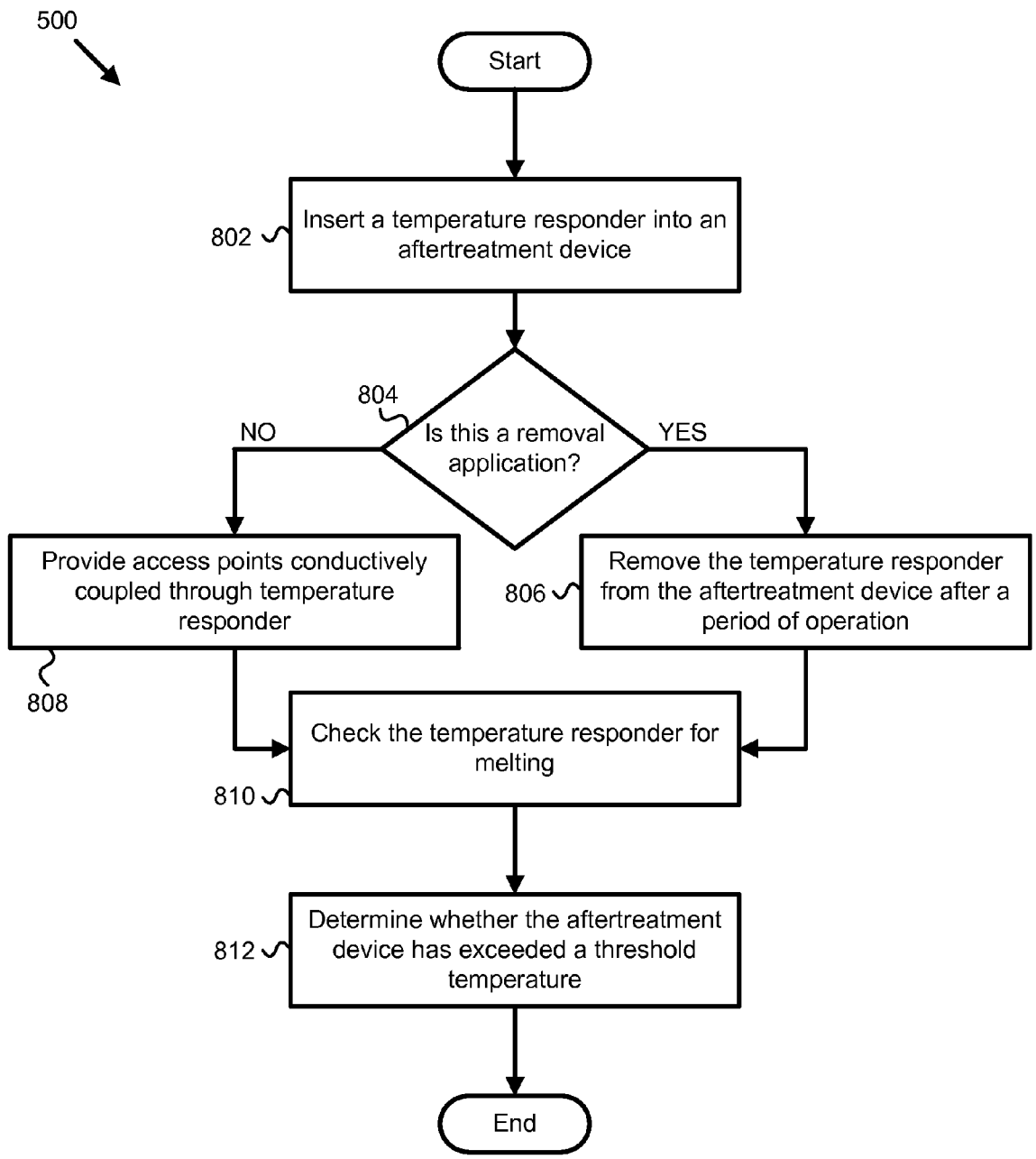
FIG. 5 is a schematic flow chart diagram illustrating one embodiment of a method for detecting temperature threshold events in an aftertreatment device in accordance with the present invention.

FIG. 5 is a schematic flow chart diagram illustrating one embodiment of a method 500 for detecting temperature threshold events in an aftertreatment device 106 in accordance with the present invention. The method 500 comprises a service technician 114A and/or manufacturing process (not shown) inserting 802 a temperature responder 108 into a region of interest 302 in an aftertreatment device 106. If a check 804 of the system 100 indicates that the present embodiment is a removal application, a service technician removes 806 the temperature responder 108 from the region of interest 302 of the aftertreatment device 106 after a period of operation of the aftertreatment device 106. The service technician 114A checks 806 the temperature responder 108 for melting by visually inspecting the temperature responder 108 for melt indications.

If the check 804 of the system 100 indicates that the present embodiment is not a removal application, a manufacturing process provides 808 two access points 110 electrically coupled through the temperature responder 108, and the observation module 114 checks 810 the temperature responder 108 for melting by measuring the resistance value 112 across the two access points 110 to determine if the temperature responder 108 has melted.

From the foregoing discussion, it is clear that the invention provides a system, method, and apparatus for detecting temperature threshold events in an aftertreatment device. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting temperature threshold events in an aftertreatment device, the apparatus comprising:
    at least one temperature responder disposed within a region of interest of the aftertreatment device, the temperature responder comprising a structure formed of a material configured to melt at a threshold temperature; and
    an observation module configured to detect the melting of the temperature responder;
    wherein the region of interest is defined within an emissions-reducing core of the aftertreatment device.

2. The apparatus of claim 1, further comprising two access points, wherein the temperature responder is configured to electrically couple the two access points, and wherein the observation module is configured to measure an electrical resistance value across the two access points and to detect the melting of the temperature responder based on the electrical resistance value, the apparatus further comprising a thermal event module configured to determine whether the region of interest of the aftertreatment device has exceeded the threshold temperature based on the melting of the temperature responder.

3. The apparatus of claim 2, wherein detecting the melting of the temperature responder comprises determining whether the electrical resistance value is a value consistent with an open circuit between the two access points.

4. The apparatus of claim 2, further comprising a plurality of temperature responders, each temperature responder comprising a structure formed of a material configured to melt at a distinct threshold temperature, wherein each temperature responder is configured to electrically couple the two access points in parallel, wherein the observation module is further configured to detect the melting of each temperature responder based on the electrical resistance value across the two access points, and wherein the thermal event module is further configured to determine whether the region of interest of the aftertreatment device has exceeded each distinct threshold temperature based on the melting of each temperature responder.

5. The apparatus of claim 4, wherein each temperature responder comprises a distinct electrical resistance value.

6. The apparatus of claim 2, further comprising an electronic control module (ECM) comprising:
    the observation module;
    the thermal event module, further configured to set a thermal event indicator based on the region of interest of the aftertreatment device exceeding the threshold temperature; and
    a fault module configured to set a fault indicator based on the thermal event indicator.

7. The apparatus of claim 6, wherein the fault indicator comprises a member selected from the group consisting of an illuminated dashboard lamp, a network data value, and a communicated signal.

8. The apparatus of claim 6, further comprising a plurality of temperature responders, each temperature responder comprising a structure formed of a material configured to melt at a distinct threshold temperature, wherein each temperature responder is configured to electrically couple the two access points in parallel, wherein the observation module is further configured to detect the melting of each temperature responder based on the electrical resistance value across the two access points, and wherein the thermal event module is further configured to determine whether the region of interest of the aftertreatment device has exceeded each distinct threshold temperature based on the melting of each temperature responder, and to set the thermal event indicator based on the region of interest of the aftertreatment device exceeding each threshold temperature.

9. The apparatus of claim 1, further comprising an encapsulation device comprising a gas impermeable chamber disposed within the region of interest, wherein the temperature responder is disposed within the encapsulation device.

10. The apparatus of claim 1, further comprising at least one temperature responder disposed within each of a plurality of areas of interest within the aftertreatment device.

11. The apparatus of claim 1, wherein the temperature responder comprises one of a wire and a material deposited on a surface of a channel within the aftertreatment device.

12. The apparatus of claim 1, wherein the temperature responder is formed from a material selected from the group consisting of calcium, magnesium, and aluminum.

13. The apparatus of claim 1, wherein the temperature responder is formed from a material selected from the group consisting of copper (Cu), silver (Ag), and gold (Au).

14. The apparatus of claim 1, wherein the temperature responder comprises a metal alloy.

15. The apparatus of claim 14, wherein the metal alloy comprises a eutectic metal alloy.

16. The apparatus of claim 1, wherein the aftertreatment device is one of a catalyst and a filter.

17. The apparatus of claim 1, wherein the region of interest comprises an axial position within the aftertreatment device, the axial position between about 0.3 X to about 1.0 X, wherein X represents an axial position defined such that X=0 is an upstream end of the aftertreatment device, and X=1 is a downstream side of the aftertreatment device.

18. The apparatus of claim 1, wherein the at least one temperature responder comprises a plurality of temperature responders each comprising a structure formed of a material configured to melt at a different threshold temperature, each threshold temperature corresponding to a different degradation level of the aftertreatment device.

19. A method for detecting temperature threshold events in an aftertreatment device, the method comprising:
    inserting a temperature responder into a region of interest in the aftertreatment device, the temperature responder comprising a structure formed of a material configured to melt at a threshold temperature, wherein the region of interest is defined within an emissions-reducing core of the aftertreatment device;
    check the temperature responder for melting after a period of operation of the aftertreatment device; and determine whether the region of interest of the aftertreatment device has exceeded the threshold temperature based on the melting of the temperature responder.

20. The method of claim 19, wherein checking the temperature responder for melting comprises removing the temperature responder from the region of interest in the aftertreatment device and visually inspecting the temperature responder for melt indications.

21. The method of claim 19, wherein checking the temperature responder for melting comprises providing two access points electrically coupled through the temperature responder, and measuring the electrical resistance value across the two access points to determine if the temperature responder has melted.

22. A system for detecting temperature threshold events in an aftertreatment device, the system comprising:
   the aftertreatment device configured to treat an exhaust gas of an internal combustion engine;
   a temperature responder disposed within a region of interest of the aftertreatment device, the temperature responder comprising a structure formed of a material configured to melt at a threshold temperature, wherein the region of interest is defined within an emissions-reducing core of the aftertreatment device;
   two access points, wherein the temperature responder is configured to electrically couple the two access points; and
   an observation module configured to measure an electrical resistance value across the two access points, and detect the melting of the temperature responder based on the electrical resistance value across the two access points.

23. The system of claim 22, further comprising an electronic control module (ECM) comprising:
   the observation module;
   a thermal event module configured to determine whether the region of interest of the aftertreatment device has exceeded the threshold temperature based on the melting of the temperature responder, and to set a thermal event indicator based on the region of interest of the aftertreatment device exceeding the threshold temperature; and
   a fault module configured to set a fault indicator based on the thermal event indicator.

24. The system of claim 22, further comprising a service tool comprising: the observation module;
   a thermal event module configured to determine whether the region of interest of the aftertreatment device has exceeded the threshold temperature based on the melting of the temperature responder, and to set a degradation indicator based on the region of interest of the aftertreatment device exceeding the threshold temperature; and
   a display module configured to provide the degradation indicator to a display outlet.

25. The system of claim 24, further comprising:
   a plurality of temperature responders, each temperature responder comprising a structure formed of a material configured to melt at a distinct threshold temperature;
   two access points corresponding to each of the temperature responders, wherein each temperature responder is configured to electrically couple the two corresponding access points in parallel;
   wherein the observation module is further configured to detect the melting of each temperature responder based on the electrical resistance value across the two corresponding access points; and
   wherein the thermal event module is further configured to determine whether the region of interest of the aftertreatment device has exceeded each distinct threshold temperature based the melting of each temperature responder, and to set the degradation indicator based on the region of interest of the aftertreatment device exceeding each threshold temperature.

* * * * *